June 9, 1931. H. H. BARDSLEY ET AL 1,809,542
CONVEYING AND GATHERING MECHANISM FOR
HARVESTERS AND ANALOGOUS IMPLEMENTS
Filed Oct. 28, 1929
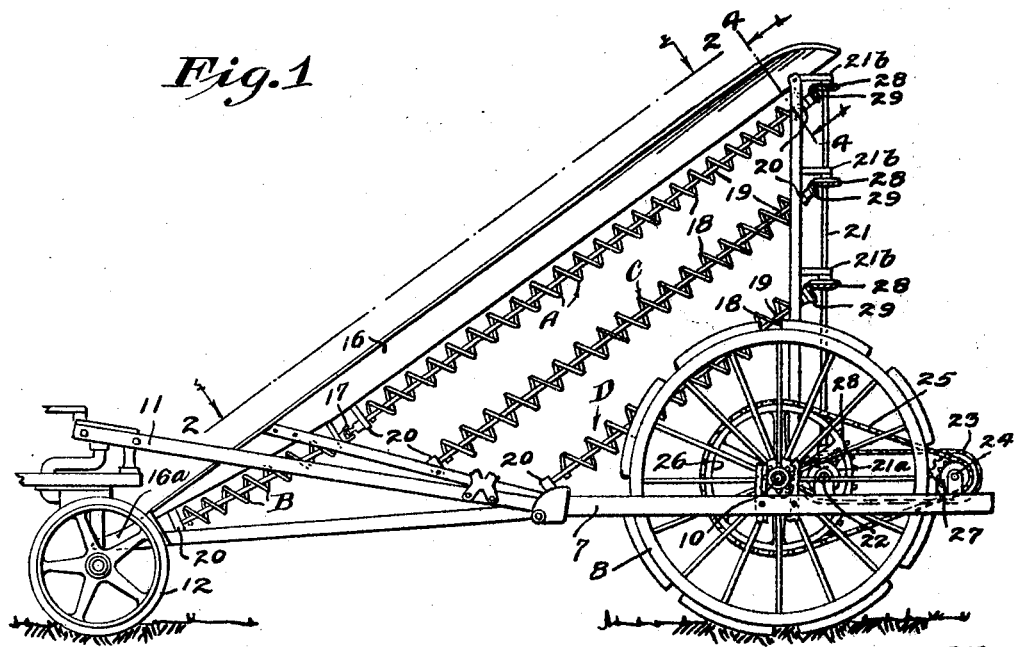
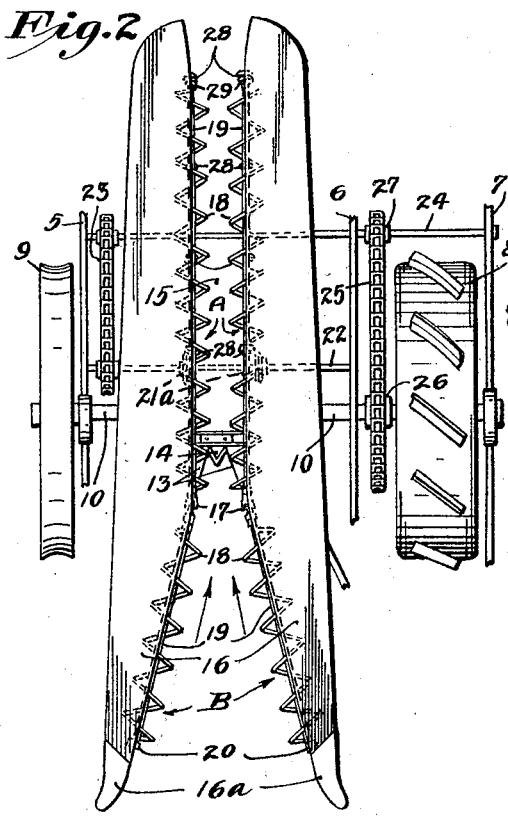
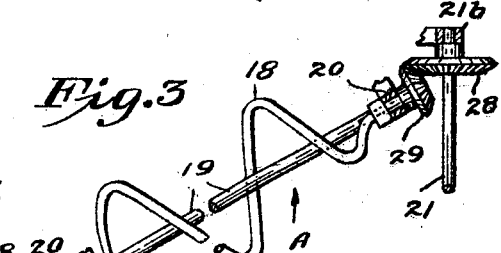
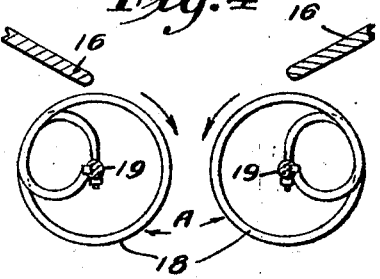
Inventors
H. H. Bardsley
William J. Ehler
By their Attorneys
Williamson Reif & Williamson Patented June 9, 1931

1,809,542

UNITED STATES PATENT OFFICE

HARVEY H. BARDSLEY AND WILLIAM J. EHLER, OF KANSASVILLE, WISCONSIN

CONVEYING AND GATHERING MECHANISM FOR HARVESTERS AND ANALOGOUS IMPLEMENTS

Application filed October 28, 1929. Serial No. 402,925.

This invention relates to binding machines, harvesters and analogous agricultural implements and especially to gathering and conveying mechanism therefor for the purpose of gathering and moving the stalks of the grain or plants in vertical position to the sickle or cutter and from there in vertical position to the packing mechanism where the stalks are formed into bundles.

At the present time most commercial binders and harvesters are provided with a series (often as many as eight) of endless conveyor chains which work in cooperation on opposite sides of the throat for moving the stalks rearwardly in vertical position. These conveyor chains have elongated and laterally projecting gathering lugs affixed at intervals thereon, which engage the stalks. The leverage and strain on said lugs and on the endless chains to which they are affixed is great, especially where the corn or other plants are thick and where the binder and harvester is not provided with special means for preventing congestion or accumulation of the stalks in the throat of the machine. As a result, the chains and lugs often have to be repaired and replaced.

It is an object of our invention to provide efficient gathering and conveying mechanisms adapted to cooperate with the cutting mechanism and pan of a binder and harvester to obviate the undesirable features of the chains and lugs utilized at this time.

It is a further object to provide cooperating gathering and conveying mechanism for binders and harvesters which will efficiently cooperate to move and maintain the stalks in vertical position for cutting and which will convey the cut stalks rearwardly in vertical position to the packing mechanism.

Another object is to provide conveying mechanism which may be built into the construction of binders and harvesters at the factory, or which may be applied as an attachment or replacement for the conveying and gathering mechanism used on standard implements at this time.

These and other objects and advantages of the invention will be apparent from the following description made in connection with the accompanying drawings in which like reference characters refer to similar parts throughout the several views and in which, Fig. 1 is a side elevation of a corn binder showing an embodiment of our invention applied thereto, portions of the implement being broken away or removed to more clearly show the construction and mounting of our cooperating gathering and conveyor elements;

Fig. 2 is a top plan view looking in the direction of the arrows indicated on Fig. 1;

Fig. 3 is a fragmentary detail view showing the construction of one of our gathering and conveying elements and the manner in which the same is driven; and Fig. 4 is a detail cross section taken on the line 4—4 of Fig. 1.

Our invention, as shown in the drawings, is applied to a corn binder of well known type, having the usual frame comprising spaced sill members 5, 6 and 7 supported by the usual bull wheel 8 at one side of the machine and a grain wheel 9 at the opposite side, said wheels being affixed to an axle 10. The forward end of the main frame is connected by reach bars 11 to a swivel truck designated as an entirety by the numeral 12. The binder is provided with the usual sickle mechanism comprising stationary plates 13 and a reciprocating cutter plate 14 moved by suitable driving mechanism across said stationary plates. The pan 15 of the binder is disposed rearwardly behind the sickle mechanism and inclined upwardly toward the rear of the machine, at the rear end of which is disposed the packing mechanism (not shown in the drawings).

The usual guiding and gathering boards 16 are mounted in spaced relation extending in an inclined direction from the forward portion of the machine to the rear thereof, said boards being provided with an enlarged converging entrance therebetween at their forward ends and terminating at said ends in a pair of metal gathering elements 16a. Below each of the gathering boards 16 a series of cooperating spiral conveying elements are mounted extending substantially parallel with boards 16 and the elements in each series being substantially in vertical alinement. On the bull wheel side of the throat of the binder, as shown in Fig. 1, three conveyor mechanisms are provided, although more or less may be utilized as required, all within the scope of our invention. The upper conveyor element at each side of the throat of the binder, as illustrated, comprises forward and rear spiral sections, designated as entireties by the letters A and B connected together by a suitable universal joint 17.

As illustrated, each conveyor element or section comprises a spiral rod preferably constructed from suitable metal material having a substantial amount of resiliency and strength. The ends of the spiral 18 are suitably fixed to the ends of a straight shaft 19, shaft 19 extending axially of the spiral. The shafts 19 of the several conveyor sections or elements are journaled in suitable bearings 20 which are affixed to the framework of the binder, at least two of said bearings being provided for each conveyor element.

The uppermost conveyor comprising sections A and B at each side of the binder throat is the longest conveyor of its series and extends in inclined direction from the forward and lower end of the machine to the rearward and upper end thereof. The forward sections B of the conveyor have their axes disposed substantially parallel to the converging edges of gathering boards 16 and the universal connections 17 permit the forward sections B to be driven by rotation of the rearward sections A.

As shown in Fig. 1, a pair of conveying mechanisms C and D are disposed below and in parallel relation with conveyor section A of the upper conveyor and the axes of conveyors A, D, and C lie substantially in a common vertical plane. The conveyor sections on the grain wheel side of the throat of the binder are mounted and arranged substantially similar to those previously described, although any desired numbers of conveyors may be utilized at the two sides of the binder throat without, of course, departing from the scope of the invention. The inner edges of the gathering boards 16 are substantially vertically alined with the axes of the several conveyor elements disposed therebelow.

The spirals of the conveyors on opposite sides of the throat are preferably arranged oppositely to more efficiently cooperate in engaging and moving the stalks of the grain rearwardly to the cutter and then upwardly and rearwardly over the pan.

The two series of conveyors may be driven by any suitable means, and, as shown, we provide a pair of parallel vertical shafts 21 disposed at the rear of the machine, shafts 21 being driven by bevel gear connections 21a at their lower ends with a transverse shaft 22 which is driven by means of a chain 23 from a countershaft 24. Countershaft 24 is driven from the axle 10 of the binder by means of a heavy chain 25 trained about a large sprocket 26 fixed to axle 10 and about a small sprocket 27 on countershaft 24. Vertical driving shafts 21 are journaled in suitable bearings 21b and each of said shafts 21 carries the appropriate number of bevel gears 28 for driving the rear ends of the shafts 18 of the several conveyor mechanisms, small bevel gears 29 being fixed to the rear ends of shafts 18 and meshed with driving gears 28.

The conveyors at the bull wheel and grain wheel sides of the binder throat are revolved in opposite directions, which is easily made possible by arranging the bevel gear driving engagement 21a of the two shafts oppositely with reference to their meshed bevel gears which are fixed to transverse shaft 22. The gear ratios of the various driving gears above described are so proportioned that the screw conveying movement of the conveying mechanisms will equal the forward travel of the binding machine or harvester over the ground.

In the operation of our improved device, the stalks of grain or plants will be gathered between the converging edges of the boards 16, the forward sections B of the upper conveyor at each side of the throat initially assisting in maintaining the stalks in vertical position and causing relative movement between said stalks and the throat of the machine. All conveyors on one side of the throat rotate in one direction, while all conveyors on the opposite side of the throat are moved in the opposite direction. The stalks are thus properly guided to the sickle mechanism and cut, the sections A, C and D of the conveyor series then cooperating to move the cut stalks rearwardly and upwardly over the pan 15, maintaining said stalks in substantially vertical position and delivering the cut stalks to the packing mechanism (not shown) at the rear of the binder.

It will be noticed that our cooperating conveyor mechanisms are positive in action and will not be subjected to the heavy strains and leverages placed on the projecting lugs and chains extensively used in binders and harvesters at this time. The spiral conveyors cooperate nicely with the gathering boards, sickle bar and pan of the binder or harvester and will withstand hard continued usage. The stalks are moved rearwardly by a screw or camming action rather than by the direct pushing action of series of elongated lugs or arms fastened to endless chains or flexible members.

It will be seen that our improved device may be substituted for the conveying mechanism now extensively utilized on binders, harvesters or analogous farm implements without requiring any great amount of alteration of the machines.

In actual practice the device has demonstrated a high efficiency for the purposes intended.

It will, of course, be understood that various changes may be made in the form, details, arrangement and proportions of the parts without departing from the scope of our invention.

What is claimed is:

1. In a harvester or analogous machine, of the type having a pair of forwardly disposed gathering members provided with converging and opposed inner edges and a throat, a pair of oppositely disposed spiral conveying elements mounted longitudinally of and below said converging inner edges, a pair of oppositely disposed conveying elements extending longitudinally of and at opposite sides of said throat, and means for rotating said several conveying elements to cause the screw conveying movement thereof to equal the forward movement of the harvester or machine over the ground.

2. In a harvester or analogous machine, of the type having a pair of forwardly disposed gathering members provided with converging and opposed inner edges and a throat, a pair of oppositely disposed spaced conveying mechanisms extending longitudinally of said gathering members and of said throat, each of said mechanisms comprising a forward spiral conveyor section having its axis disposed below one of said converging edges, and a rearward spiral conveyor section connected to said forward section by a universal joint, and driving means connected with said rearward conveyor sections, said driving means being arranged to cause the screw conveying movement of said conveyors to equal the forward movement of the harvester or machine over the ground.

3. In a harvester or analogous machine of the type having a pair of spaced gathering members defining a throat, a series of spaced spiral conveyors disposed one below the other and extending longitudinally below one of said gathering members and at least one spiral conveyor extending longitudinally of and below the other gathering member, a pair of upwardly projecting driving shafts, connections between one of said driving shafts and said series of conveyors and connections between said second driving shaft and said last mentioned conveyor whereby conveyors at opposite sides of the device will be rotated in opposite directions.

4. In a wheel-supported harvester or analogous machine, a pair of spaced gathering and guiding members inclined upwardly from their forward ends, a pair of cooperating inclined spiral conveying members disposed longitudinally of and beneath said gathering and guiding members with their axes substantially aligned with the opposed longitudinal edges of said members, means for driving said cooperating conveying members at equal speeds and in opposite directions, said driving means being connected with the wheels of the machine for causing the screw conveyor movement of said conveying members to always be equal to the forward traveling movement of the machine over the ground.

In testimony whereof we affix our signatures.

HARVEY H. BARDSLEY.
WILLIAM J. EHLER.